(12) United States Patent
Shannon et al.

(10) Patent No.: US 6,961,774 B1
(45) Date of Patent: Nov. 1, 2005

(54) SYSTEM AND METHOD FOR PERFORMING HAND-OFFS BETWEEN INTERNET PROTOCOL (IP) CORE NETWORKS IN THE WIRELESS DOMAIN

(75) Inventors: Michael L. Shannon, San Jose, CA (US); Manjari Asawa, Cupertino, CA (US); Roy E. Hanzel, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 804 days.

(21) Appl. No.: 09/922,086

(22) Filed: Aug. 2, 2001

(51) Int. Cl.[7] ............................................. G06F 15/16
(52) U.S. Cl. ...................... 709/227; 709/249; 455/436
(58) Field of Search ............................... 709/227, 228, 709/249; 455/436–444

(56) References Cited

U.S. PATENT DOCUMENTS

| | | | | |
|---|---|---|---|---|
| 6,269,402 B1 * | 7/2001 | Lin et al. ..................... | 709/227 |
| 6,360,264 B1 * | 3/2002 | Rom .......................... | 709/227 |
| 6,466,556 B1 * | 10/2002 | Boudreaux .................. | 455/442 |
| 6,473,413 B1 * | 10/2002 | Chiou et al. ................. | 455/436 |
| 6,490,451 B1 * | 12/2002 | Denman et al. ............. | 455/436 |
| 6,590,880 B1 * | 7/2003 | Maenpaa et al. ............ | 455/436 |
| 6,651,105 B1 * | 11/2003 | Bhagwat et al. ............ | 709/227 |
| 6,665,537 B1 | 12/2003 | Lioy ........................... | 455/435 |
| 6,668,175 B1 * | 12/2003 | Almgren et al. ............ | 455/522 |
| 6,775,253 B1 * | 8/2004 | Agrawal et al. ............ | 455/436 |

OTHER PUBLICATIONS

Handley, et al., RFC 2543, "SIP: Session Initiation Protocol," Internet Engineering Task Force, Mar. 1999.*

(Continued)

Primary Examiner—Saleh Najjar
Assistant Examiner—Victor Lesniewski
(74) Attorney, Agent, or Firm—Baker Botts L.L.P.

(57) ABSTRACT

A system for performing a hand-off between two IP core networks in the wireless domain includes a source mobility control function (MCF) within a source IP core network that is coupled to a source access network providing service to a mobile unit. The source MCF is coupled to a source bearer path gateway (BPGW) within the source IP core network. The source BPGW communicates bearer traffic associated with the mobile unit between the source access network and a public switched telephone network (PSTN) gateway within the source IP core network. The PSTN gateway communicates the bearer traffic between the source BPGW and a PSTN coupled to the source IP core network. The source MCF is functionally separate from a call agent (CA) within the source IP core network. The CA is also coupled to the source BPGW. The CA sets up a first segment of a bearer path for the bearer traffic between the source BPGW and the PSTN gateway, and the source MCF sets up a second segment of the bearer path for the bearer traffic between the source access network and the source BPGW. A hand-off occurs between the source IP core network and the target IP core network in the wireless domain when the source MCF takes down the second segment and sets up third and fourth segments of the bearer path for the bearer traffic in response to the mobile unit entering a service area of a target access network coupled to a target IP core network. The third segment is between the source BPGW and a target BPGW within the target IP core network that communicates the bearer traffic between the target access network and the source BPGW, and the fourth bearer segment is between the target access network and the target BPGW.

23 Claims, 3 Drawing Sheets

OTHER PUBLICATIONS

Internet Engineering Task Force (IETF) Request for Comment (RFC) 2543, "SIP: Session Initiation Protocol," Mar., 1999, 132 pages.

Internet Engineering Task Force (IETF) Request for Comment (RFC) 2719, "Framework Architecture for signaling Transport," Oct., 1999, 21 pages.

Internet Engineering Task Force (IETF) Request for Comment (RFC) 2705, "Media Gateway Control Protocol (MGCP)," Version 1.0, Oct., 1999, 116 pages.

U.S. Appl. No. 09/748,759, entitled "Mobility Manager in a Wireless IP Core Network," filed Dec. 21, 2000, 35 total pages.

* cited by examiner

SYSTEM AND METHOD FOR PERFORMING HAND-OFFS BETWEEN INTERNET PROTOCOL (IP) CORE NETWORKS IN THE WIRELESS DOMAIN

TECHNICAL FIELD OF THE INVENTION

This invention relates in general to the field of communications and in particular to a system and method for performing hand-offs between IP core networks in the wireless domain.

BACKGROUND OF THE INVENTION

In a typical mobile communications system, mobile units are supported by radio networks coupled to different mobile switching centers (MSCs) providing an interface between the radio networks and the public switched telephone network (PSTN). In traditional circuit-switched environments, an MSC controls both the signaling and bearer paths for a call. When a mobile unit participating in a communications session roams from the service area of one radio network to the service area of another radio network, the communications session may be handed-off between the MSCs coupled to the radio networks. When a hand-off occurs between two MSCs, the source MSC establishes a circuit-switched connection to the next switch in the network providing service to the mobile unit. The source MSC has to maintain the original circuit-switched connection, providing an anchor for the bearer path and the second circuit-switched connection. Additional connections may need to be added if the mobile unit roams into other network service areas, and these connections may need to be linked to the original connection.

IP networks have begun to replace MSCs. Accordingly, systems and methods are needed for handing-off mobile communications sessions between IP networks coupling radio networks to the PSTN

SUMMARY OF THE INVENTION

In accordance with the present invention, the disadvantages and problems associated previous systems and methods for performing hand-offs have been substantially reduced or eliminated.

A system for performing a hand-off between two IP core networks in the wireless domain includes a source mobility control function (MCF) within a source IP core network coupled to a source access network providing service to a mobile unit. The source MCF is coupled to a source bearer path gateway (BPGW) within the source IP core network. The source BPGW communicates bearer traffic associated with the mobile unit between the source access network and a PSTN gateway within the source IP core network. The PSTN gateway communicates the bearer traffic between the source BPGW and a PSTN coupled to the source IP core network. The source MCF is functionally separate from a call agent (CA) within the source IP core network. The CA is also coupled to the source BPGW. The CA sets up a first segment of a bearer path for the bearer traffic between the source BPGW and the PSTN gateway, and the source MCF sets up a second segment of the bearer path for the bearer traffic between the source access network and the source BPGW. A hand-off occurs between the source IP core network and the target IP core network in the wireless domain when the source MCF takes down the second segment and sets up third and fourth segments of the bearer path for the bearer traffic in response to the mobile unit entering a service area of a target access network coupled to a target IP core network. The third bearer segment is between the source BPGW and a target BPGW within the target IP core network that communicates the bearer traffic between the target access network and the source BPGW, and the fourth bearer segment is between the target access network and the target BPGW.

Embodiments of the present invention may provide a number of important technical advantages over previous systems and methods for performing hand-offs. In certain embodiments, hand-offs between core networks may be performed by mobility control functionality without accessing call control functionality. Accordingly, hand-offs may be performed entirely within the IP wireless domain, allowing mobility control functionality within a core network to be separated from call control functionality. Separating these functionalities in turn allows functionalities associated with legacy architecture MSCs to be distributed among components in an IP-based system. Distributing functionality in this way may provide benefits such as greater network scalability, greater operability between core network components built by different manufacturers, and support for different access technologies. Distributing MSC functionality among components in an IP-based system also allows for a convergence of fixed and mobile services in a core network, which has become increasingly important as communications networks have evolved.

Certain embodiments of the present invention may also allow the control path of a call to remain fixed for the duration of the call. The bearer path between the source BPGW and a network such as the PSTN, the Internet, or other suitable network may also remain fixed for the duration of the call. Moreover, resetting the bearer path between the radio access network (RAN) and the source BPGW during a hand-off allows old resources to be released and fewer core network resources to be used when the mobile unit roams from one network service area to another. Certain embodiments of the present invention may also provide for the use of IP-based protocols, such as media gateway control protocol (MGCP) and session initiation protocol (SIP), to control call hand-offs from one IP core network to another. The use of such protocols may, in certain embodiments, substantially replace circuit-switched based methods used in the past.

Systems and methods incorporating one or more of these or other technical advantages are well suited for performing hand-offs between IP core networks. Other technical advantages are readily apparent to those skilled in the art from the following figures, descriptions, and claims.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE INVENTION

Figure 1:
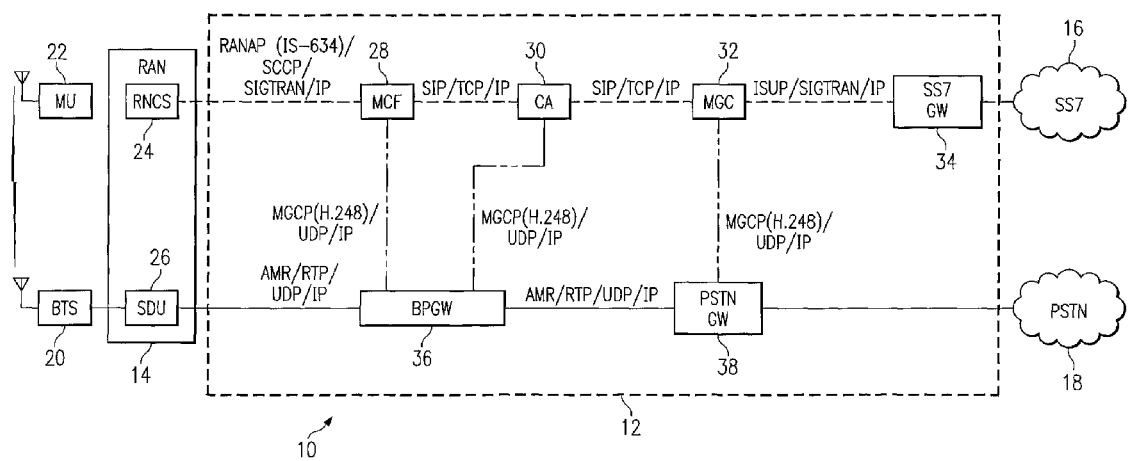
FIG. 1 illustrates an exemplary distributed system for providing service to a mobile unit.

FIG. 1 illustrates an exemplary distributed system 10 for providing service to mobile unit 22. System 10 includes IP core network 12 coupling radio access network (RAN) 14 to SS7 network 16 and PSTN 18. RAN 14 is coupled to a base transceiver station (BTS) 20 providing wireless communications services for mobile unit 22. Mobile unit 22 may be an analog or digital cellular telephone, personal digital assistant (PDA), pager, or other suitable wireless device providing wireless communications for voice, data, video, signaling, control, or other data using any suitable wireless communications protocol or combination of protocols by establishing a wireless link with BTS 20. For example, IS-95B may be used for communications between mobile unit 22 and BTS 20. BTS 20 includes hardware, software, or a combination of hardware and software supporting a wireless link with mobile unit 22 using any suitable packet-switched or circuit-switched wireless communications protocols. RAN 14 provides a link coupling BTS 20 with IP core network 12 and may manage wireless resources for BTS 20. For example, RAN 14 may perform channel setup, frequency hopping, "soft" hand-offs, and other suitable functions for BTS 20. Although RAN 14 is shown coupled to one BTS 20, RAN 14 may be coupled to a plurality of BTSs 20 providing services to a plurality of mobile units 22. RAN 14 includes radio network control system (RNCS) 24 and selection and distribution unit (SDU) 26 for communicating signaling and bearer traffic, respectively, with IP core network 12.

IP core network 12 provides a link coupling RAN 14 with PSTN 18 and SS7 network 16. IP core network 12 may include a universal mobile telecommunications system (UMTS) core network and may support multiple wireline and wireless access networks, such as digital subscriber line (DSL) networks, third-generation (3G) RANs, second-generation (2G) RANs, cable networks, existing wireline networks (such as PSTNs and integrated services digital networks (ISDNs)), enterprise networks, and any other suitable networks. IP core network 12 includes mobility control function (MCF) 28, call agent (CA) 30, media gateway controller (MGC) 32, SS7 gateway 34, BPGW 36, and PSTN gateway 38.

In general, MCF 28 is a wireless-specific core network component that sets up and takes down connections between core network 12 and RAN 14 or any other suitable wireless access network. MCF 28 may also set up and take down connections between IP core network 12 and another IP core network 12. Additionally, MCF 28 may convert RAN-specific protocol information to generic IP-based protocol information, and vice versa, to provide a signaling interface between RAN 14 and core network 12. In particular, MCF 28 may communicate signaling traffic between RAN 14 and CA 30. Signaling traffic may be any traffic containing data used for system control, synchronization, checking, signaling, or service signals used in system management and operations or any other appropriate signaling data. The path through system 10 taken by signaling traffic associated with a particular mobile unit 22 may be referred to as a signaling path. MCF 28 may communicate signaling traffic with RNCS 24 using any suitable application-layer protocol or combination of protocols over any suitable transport-layer protocol or combination of protocols. For example, MCF 28 may communicate signaling traffic with RNCS 24 using IS-634 over signaling connection control part (SCCP) over signaling transport (SIGTRAN). A protocol such as the UMTS-defined protocol radio access network access protocol (RANAP) may be used instead of IS-634. SCCP is part of the ITU-T #7 signaling protocol and the SS7 protocol. SIGTRAN is defined by Internet Engineering Task Force (IETF) Request for Comment (RFC) 2719 and may be used for transporting packet-based PSTN signals over IP networks, including transporting signals between a signaling gateway and media gateway or media gateway controller, transporting "backhaul" signals from a media gateway to a media gateway controller, and transporting transaction capabilities application part (TCAP) information between a signaling gateway and other IP nodes. MCF 28 may communicate signaling traffic with CA 30 using any suitable application-layer signaling protocol or combination of protocols. For example, MCF 28 may communicate with CA 30 using session initiation protocol (SIP) or an extension of SIP over TCP/IP. SIP is an application-layer call-control protocol defined by IETF RFC 2543 for creating, modifying, and terminating sessions, including Internet multimedia conferences, Internet telephone calls, and multimedia distribution sessions, with one or more participants communicating by unicast, multicast, or a combination of unicast and multicast.

MCF 28 controls bearer paths between BPGW 36 and RAN 14. The path through system 10 taken by bearer traffic associated with a particular mobile unit 22 may be referred to as a bearer path, and bearer traffic may be any traffic containing user data, such as audio, video, a combination of audio and video, encoded for transmission over system 10. MCF 28 may communicate with BPGW 36 to, for example, set up or take down the segment of a bearer path between BPGW 36 and RAN 14 using any suitable application-layer protocol for externally controlling media gateways. For example, MCF 28 may communicate with BPGW 36 using media gateway control protocol (MGCP) or H.248 over UDP/IP. MGCP is a call-control protocol defined by IETF RFC 2705 for communication between media gateways and signaling devices.

IP core network 12 may route signaling and bearer traffic for a mobile call originating within the service area of RAN 14 between SS7 network 16 and PSTN 18 on one side of IP core network 12 and RAN 14 on the other side of IP core network 12. In particular, bearer traffic for a mobile call originating within the service area of RAN 14 is communicated between SDU 26 and BPGW 36, between BPGW 36 and PSTN gateway 38, and between PSTN gateway 38 and PSTN 18. Signaling traffic for the mobile call is communicated between RNCS 24 and MCF 28, between MCF 28 and CA 30, between CA 30 and MGC 32, between MGC 32 and SS7 gateway 34, and between SS7 gateway 34 and SS7 network 16. Reference to mobile calls is meant to include any communication sessions in which mobile unit 22 may participate. When mobile unit 22 roams into the service area of a RAN 14 coupled to a different IP core network 12, a hand-off may be performed between the source IP core network 12 and the target IP core network 12. Such a hand-off may be referred to as an "inter-core" hand-off. In general, "source" is meant as a reference to devices providing service to mobile unit 22 before an inter-core hand-off. Similarly, "target" is meant as a reference to devices providing service to mobile unit 22 after an inter-core hand-off in lieu of corresponding source devices. A source device may provide service to mobile unit 22 both before and after a hand-off and that reference to a device as a "source" or "target" device is not meant to be limiting in any way. During an inter-core hand-off, source MCF 28 may take down the segment of the bearer path between source SDU 26 and source BPGW 36 and set up a new bearer path segment between source BPGW 36 and target BPGW 36 providing a link between the target RAN 14 and PSTN 18. In this way, the bearer path segments between source BPGW 36 and PSTN gateway 38 and between PSTN gateway 38 and PSTN 18 may remain fixed for the duration of the mobile call and CA 30 need not be involved in the hand-off. Additionally, the signaling path segments between source MCF 28*a* and SS7 network 16 may remain fixed throughout the mobile call. In one embodiment, source MCF 28 sets up the new bearer path segment by determining the IP address of target MCF 28 and communicating a SIP "invite" message to the target MCF 28 and, in response, receiving information about the IP address of target BPGW and the port thereof for communication with target BPGW 36. Source MCF 28 then communicates that information (using MGCP) to source BPGW 36, which communicates bearer traffic for the mobile call with target BPGW 36 after the hand-off. Source MCF 28 and target MCF 28 may communicate with each other in any appropriate manner. For example, source MCF 28 and target MCF 28 may communicate with each other over an IP network coupling source IP core network 12 and target IP core network 12. When a mobile call is handed-off to IP core network 12, MCF 28 may set up a bearer path segment between SDU 26 and BPGW 36 for bearer traffic associated with a mobile unit that has entered the service area of RAN 14 in response to a SIP invite message received from another MCF 28, MCF 28 may also communicate information about BPGW 36, such as the IP address of BPGW 36 and the port thereof for communication with the source BPGW 36, to the source MCF 28.

CA 30 communicates signaling traffic between MCF 28 and MGC 32 and controls bearer paths between BPGW 36 and PSTN gateway 38. CA 30 is functionally separate from MCF 28 and lacks mobility specific functions. In particular, CA 30 need not participate in inter-core hand-offs. As a result, CA 30 provides support for different access technologies and allows for a convergence of fixed and mobile services in core network 12. CA 30 may have an open-standard interface instead of a closed proprietary interface and may interface with MCFs 28 and other appropriate network devices built by different vendors. CA 30 may communicate signaling traffic with MCF 28 and MGC 32 using any suitable application-layer signaling protocol or combination of protocols. For example, CA 30 may communicate with MCF 28 and MGC 32 using SIP or an extension of SIP over TCP/IP. CA 30 may control bearer paths between BPGW 36 and PSTN gateway 38 by communicating with BPGW 36 using any suitable application-layer protocol for externally controlling media gateways. For example, CA 30 may communicate with BPGW 36 using MGCP or H.248 over UDP/IP.

MGC 32 provides a link between CA 30 and SS7 gateway 34, controls PSTN gateway 38, and may be responsible for call processing, service logic, routing, billing, and other appropriate gateway control functions. MGC 32 may communicate signaling traffic with CA 32 using any suitable application-layer signaling protocol. For example, as described above, MGC 32 may communicate with CA 30 using SIP over TCP/IP. MGC 32 may also communicate with CA 30 using an extension of SIP for communication between the components of IP core network 12. MGC 32 may communicate signaling traffic with SS7 gateway 34 using any suitable application-layer protocol for communicating call set up signaling information over any suitable transport layer protocol for transporting packet-based PSTN signals over IP networks. For example, MGC 32 may communicate with SS7 gateway 34 using ISDN user part (ISUP) over SIGTRAN. SS7 gateway 34 may provide a signaling interface between core network 12 and SS7 network 16. MGC 32 may control PSTN gateway 38 using any suitable application layer protocol for externally controlling media gateways. For example, MGC 32 may communicate with PSTN gateway 38 using MGCP or H.248 protocol over UDP/IP.

In general, BPGW 36 provides a media interface between IP core network 12 and RAN 14 or another core network 12. Specifically, BPGW 36 communicates bearer traffic between PSTN gateway 38 and RAN 14 or another core network 12 and may perform negotiation, transcoding, bearer traffic switching, media control, media conversion, and any other suitable media gateway tasks. BPGW 36 may communicate with RAN 14 and other media gateways, such as other BPGWs 36 and PSTN gateways 38, using any suitable set of protocols for communicating bearer traffic. For example, BPGW 36 may communicate bearer traffic using adaptive multi-rate (AMR) over real-time transport protocol (RTP) on top of UDP/IP. AMR is a voice encoding algorithm, and RTP is a protocol for the transport of real-time data, including audio and video, over an IP network. MCF 28 and CA 30 may both control BPGW 36. Specifically, MCF 28 sets up and takes down bearer paths between BPGW 36 and RAN 14 or another IP core network 12 and CA sets up and takes down bearer paths between BPGW 36 and PSTN gateway 38. As described above, MCF 28 and CA 30 may control BPGW 36 using MGCP or H.248 over UDP/IP. During an inter-core hand-off to a target IP core network 12, MCF "instructs" BPGW 36 to communicate bearer traffic associated with a mobile unit 22 that has entered the service area of a target RAN 14 with a target BPGW 36 within the target IP core network 12. In one embodiment, the port of BPGW 36 previously used for communication with SDU 26 is modified by MCF 28 for communication with a target BPGW 36 within target IP core network 12. While the segment of the bearer path for bearer traffic associated with mobile unit 22 between BPGW 36 and RAN 14 changes during an inter-core hand-off, the bearer path segment between BPGW 36 and PSTN gateway 38 does not change. In this way, CA 30 need not be involved in inter-core hand-offs and may provide support for both fixed and mobile access technologies.

PSTN gateway 38 provides a media gateway between IP core network 12 and PSTN 18, translating bearer traffic from IP format to PSTN circuit-switched format, and vice versa. As described above, PSTN gateway 38 may communicate bearer traffic with BPGW 36 using AMR over RTP on top of UDP/IP and may communicate with MGC 32 using MGCP or H.248 over UDP/IP. PSTN gateway 38 is controlled by MGC 32, which may set up and take down bearer paths between PSTN gateway 38 and other media gateways, such as BPGW 36, and networks, such as PSTN 18.

Figure 2:
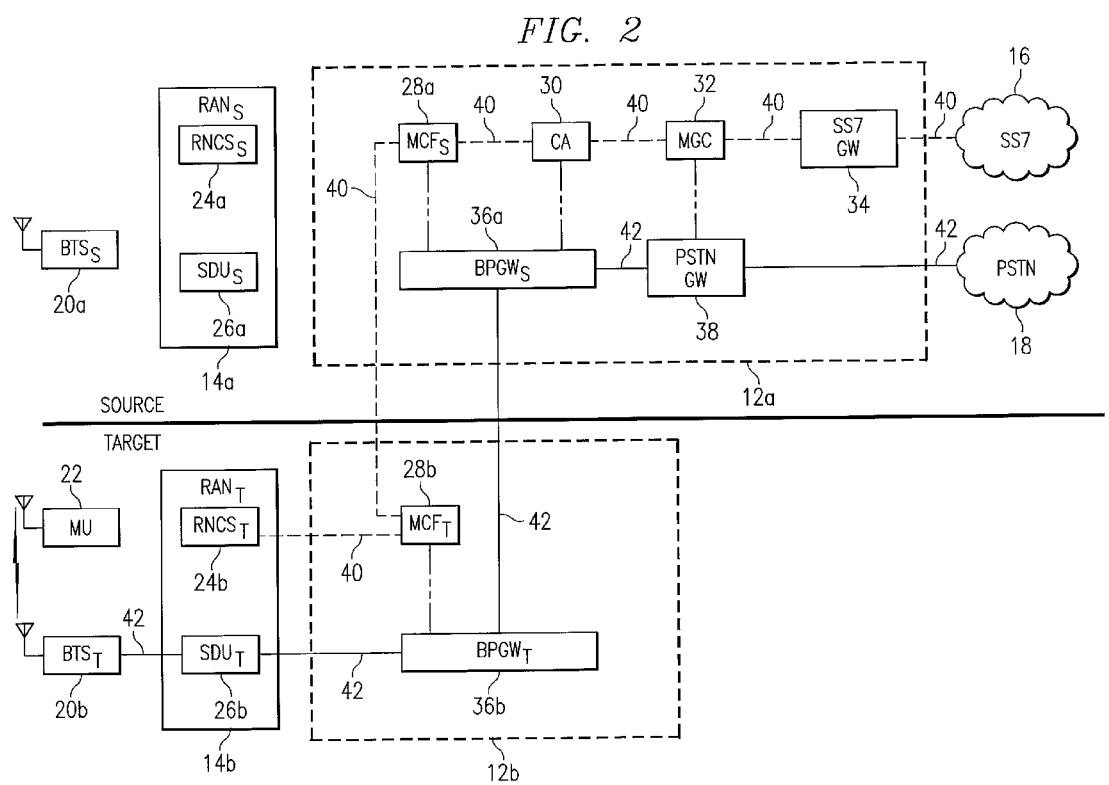
FIG. 2 illustrates the routing of signaling and bearer traffic after a hand-off between two IP core networks.

FIG. 2 illustrates the routing of signaling and bearer traffic after a hand-off between two IP core networks 12. As described above, an inter-core hand-off may be performed when a hand-off between RANs 14 requires a hand-off between IP core networks 12. For example, when mobile unit 22 leaves the service area of source RAN 14*a* and enters the service area of target RAN 14*b*, an inter-core hand-off may be required due to the fact that RANs 14 are coupled to different IP core networks 12. An inter-core hand-off may also be required when there are no links between RANs 14 or RANs 14 communicate using different frequency bands. Although target IP core network 12*b* is depicted including only target MCF 28*b* and target BPGW 36*b*, core networks 12 may include similar network architectures. IP core networks 12 may communicate with each other, for example, using an IP network coupling IP core networks 12.

Mobile unit 22 has moved out of the service area of source BTS 20a and into the service area of target BTS 20b, and the mobile call in which mobile unit 22 is participating has been handed-off from source IP core network 12a to target IP core network 12b. Prior to the inter-core hand-off, signaling traffic associated with mobile unit 22 was communicated between source RAN 14a and SS7 network 16 using source RNCS 24a, source MCF 28a, CA 30, MGC 32, and SS7 gateway 34. Bearer traffic associated with mobile unit 22 was communicated between mobile unit 22 and PSTN 18 using source BTS 20a, source SDU 26a, source BPGW 36a, and PSTN gateway 38. After the inter-core hand-off, the signaling path 40 between source MCF 28a and SS7 network 16 is unchanged, traversing source MCF 28a, CA 30, MGC 32, and SS7 gateway 34. On the other hand, certain segments of signaling path 40 and bearer path 42 have changed as a result of the hand-off. Specifically, signaling traffic associated with mobile unit 22 is no longer communicated using source RNCS 24a. Signaling traffic associated with mobile unit 22 is instead communicated using target RNCS 24b and target MCF 28b, before reaching source MCF 28a or mobile unit 22. Moreover, bearer traffic associated with mobile unit 22 is no longer communicated using source BTS 20a and source SDU 26a. Instead, bearer traffic associated with mobile unit 22 traverses target BTS 20b, target SDU 26b, and target BPGW 36b before reaching source BPGW 36a or mobile unit 22.

Figure 3:
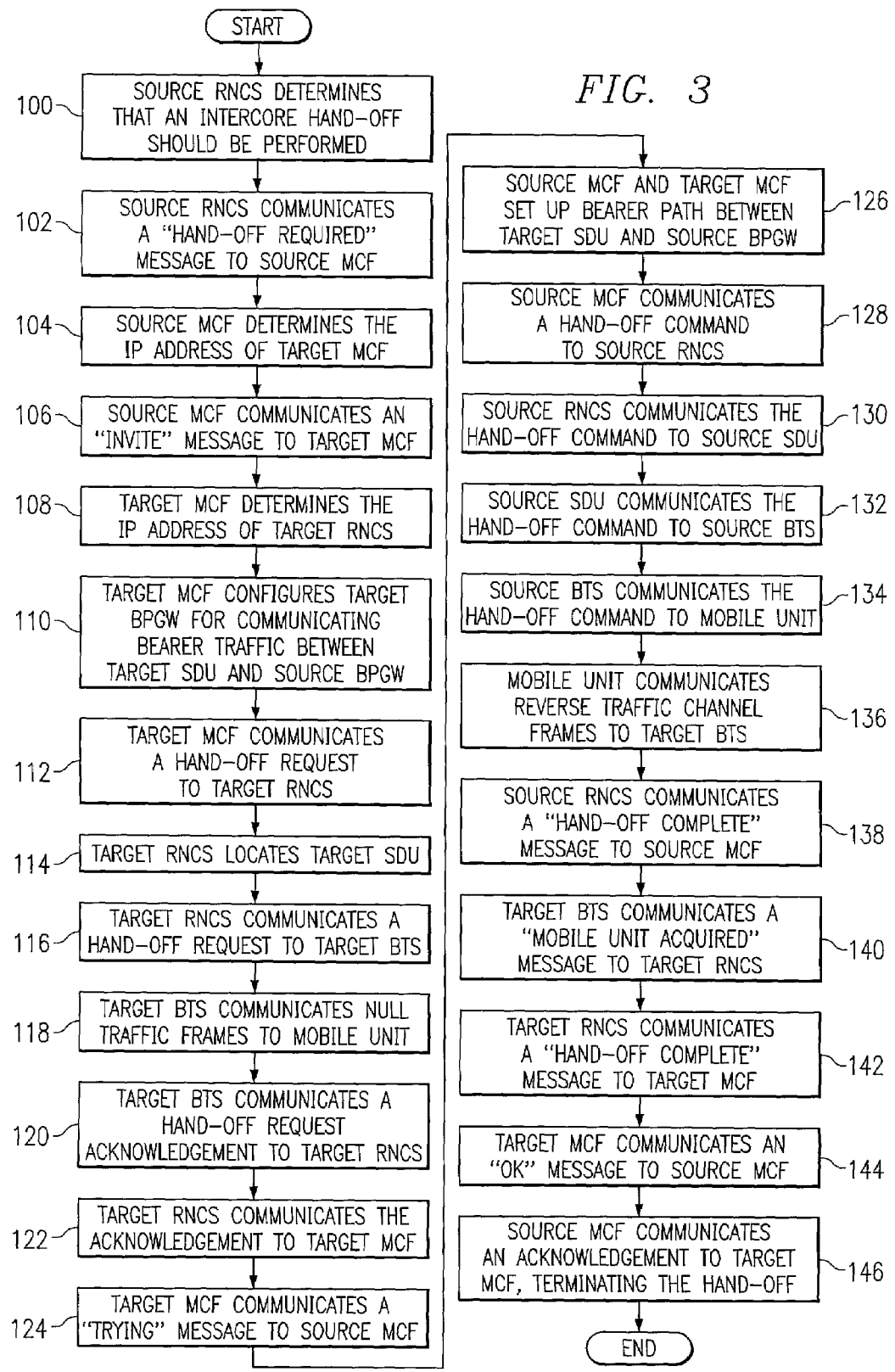
FIG. 3 illustrates an exemplary method for performing a hand-off between two IP core networks.

FIG. 3 illustrates an exemplary method for performing a hand-off between two IP core networks. The method starts at step 100, where source RNCS 24a determines that an inter-core hand-off should be performed. As described above, an inter-core hand-off may be performed when mobile unit 22 enters the service area of target RAN 14b, which is coupled to target IP core network 12b. Source RNCS 24a may determine whether an inter-core hand-off should be performed in any suitable manner. For example, as mobile unit 22 approaches the service area of target BTS 20b, mobile unit 22 may communicate a pilot strength measurement message to source RNCS 24a identifying target BTS 20b. Source RNCS 24a may then access an internal database to determine whether target BTS 20b is coupled to RAN 14a. In FIG. 3, target BTS 20b is coupled to target RAN 14b, which is coupled to target IP core network 12b. Accordingly, source RNCS 24a determines that an inter-core hand-off should be performed between source IP core network 12a and target IP core network 12b, and the method proceeds to step 102, where source RNCS 24a communicates a "hand-off required" message to a source MCF 28a identifying mobile unit 22 and target BTS 20b. Source MCF 28a then determines the IP address of target MCF 28b at step 104 using the ID of target BTS 20b. After locating target MCF 28b, source MCF 28a communicates, at step 106, a SIP "invite" message to target MCF 28b containing the ID of target BTS 20b. As described above, source MCF 28a may communicate with target MCF 28b, for example, using an IP network coupling source IP core network 12a and target IP core network 12b.

Target MCF 28b receives the SIP invite message and, at step 108, determines the IP address of target RNCS 24b using the ID of target BTS 20b. Target MCF 28b may make this determination by, for example, accessing an internal database containing information about RNCSs 24 within target RAN 14b or an external server containing similar information. After locating target RNCS 24b, target MCF 28b opens two ports of target BPGW 36b for bearer path 42 at step 110. One port is opened for communication with source BPGW 36a, and the other port is opened for communication with target SDU 26b within target RAN 14b. Target MCF 28b then, at step 112, communicates a hand-off request to target RNCS 24b identifying the IP address of target BPGW 36b and the port thereof opened for communication with target SDU 26b. Target RNC 24b receives the request and, at step 114, locates target SDU 26b for communicating bearer traffic between target BTS 20b and target BPGW 36b, specifically identifying the ID and IP address of target SDU 26b and the port thereof for communication with target BPGW 36b. Target RNCS 24b then communicates a hand-off request to target BTS 20b at step 116. This request may be communicated in any appropriate manner. For example, target RNCS 24b may communicate the request to target BTS 20B via target SDU 26b providing a link to target BTS 20b. After receiving the hand-off request, target BTS 20b communicates null traffic frames at step 118 to mobile unit 22. Target BTS 20b then communicates a hand-off request acknowledgement to target RNCS 24b at step 120 along with information about the allocated channel between target BTS 20b and mobile unit 22. Target RNCS 24b receives the acknowledgement and, at step 122, communicates the acknowledgement to target MCF 28b along with the IP address of target SDU 26b, the port of SDU 26b for communication with BPGW 36b, and information about the allocated channel between target BTS 20b and mobile unit 22.

The method then proceeds to step 124, where target MCF 28b communicates a "trying" message to source MCF 28a. Source MCF 28a and target MCF 28b then set up bearer path 42 between target SDU 26b and source BPGW 36a at step 126. The port of source bearer path gateway 36a previously used for communication with source SDU 26a is modified by source MCF 28a for communication with target BPGW 36b. Source MCF 28a may make this modification to bearer path 42 by providing source BPGW 36a the IP address of BPGW 36b, the port of target BPGW 36b for communication with source BPGW 36A, and information about the bearer traffic associated with mobile unit 22. In this way, MCF 28a sets up bearer path 42 between source BPGW 36a and target BPGW 36b. Target MCF 28b sets up bearer path 42 between target BPGW 36b and target SDU 26b by communicating to target BPGW 36b the IP address of target SDU 26b and the port thereof for communication with target BPGW 36b. Source MCF 28a and target MCF 28b may set up these segments of bearer path 42 substantially simultaneously or sequentially in any order without departing from the intended scope of the present invention. After bearer path 42 between target SDU 26B and source BPGW 36a has been set up, source MCF 28a communicates a hand-off command to mobile unit 22 via source RNCS 24a, source SDU 26a, and source BTS 20a at steps 128–134.

The method then proceeds to step 136, where, after receiving the hand-off command, mobile unit 22 communicates to target BTS 20b reverse traffic channel frames along with a "hand-off" complete message indicating that mobile unit 22 has acquired the forward channels communicated at step 118. Source RNCS 24a then communicates a "hand-off complete" message to source MCF 28a at step 138, and target BTS 20b communicates a "mobile unit acquired" message to target RNCS 24B at step 140. Steps 138 and 140 may occur substantially simultaneously or sequentially in any order without departing from the intended scope of the present invention. After receiving the "mobile unit acquired" message, target RNCS 24b communicates a "hand-off complete" message to target MCF 28b at step 142. Target MCF 28b then communicates, at step 144, an "OK" message to source MCF 28a. The method then proceeds to step 146, where source MCF 28a communicates an acknowledgement to target MCF 28b terminating the hand-off, and the method ends.

Although the present invention has been described with one embodiment, divers changes, variations, alterations, transformations, and modifications may be suggested to a person of skill in the art, and it is intended that the present invention encompass such changes, variations, alterations, transformations, and modifications as fall within the spirit and scope of appended claims.

What is claimed is:

1. A system for performing a hand-off between two internet protocol (IP) core networks in a wireless domain, comprising:
a source mobility control function (MCF) within a source IP core network, the source IP core network coupled to a source access network providing service to a mobile unit;
the source MCF coupled to a source bearer path gateway (BPGW), the source BPGW being within the source IP core network and operable to communicate bearer traffic associated with the mobile unit between the source access network and a public switched telephone network (PSTN) gateway within the source IP core network, the PSTN gateway operable to communicate the bearer traffic between the source BPGW and a PSTN coupled to the source IP core network;
the source MCF being functionally separate from a call agent (CA) within the source IP core network, the CA coupled to the source BPGW and operable to set up a first segment of a bearer path for the bearer traffic between the source BPGW and the PSTN gateway;
the source MCF operable to set up a second segment of the bearer path for the bearer traffic between the source access network and the source BPGW;
the source MCF further operable to take down the second segment and set up third and fourth segments of the bearer path for the bearer traffic in response to the mobile unit entering a service area of a target access network coupled to a target IP core network, the third segment being between the source BPGW and a target BPGW within the target IP core network, the fourth segment being between the target access network and the target BPGW, the target BPGW operable to communicate the bearer traffic between the target access network and the source BPGW, resulting in a hand-off between the source IP core network and the target IP core network in the wireless domain.

2. The system of claim 1, wherein the source MCF is further operable to request a target MCF coupled to the target BPGW to set up the fourth segment of the bearer path for the bearer traffic between the target access network and the target BPGW.

3. The system of claim 2, wherein the source MCF communicates a session initiation protocol (SIP) "invite" message to the target MCF to request the target MCF to set up the fourth segment.

4. The system of claim 1, wherein the source MCF is further operable to take down the third segment and the fourth segment and set up fifth and sixth segments of the bearer path for the bearer traffic in response to the mobile unit entering a service area of another target access network coupled to another target IP core network, the fifth segment being between the source BPGW and another target BPGW within the other target IP core network, the sixth segment being between the other target access network and the other target BPGW, the other target BPGW operable to communicate the bearer traffic between the other target access network and the source BPGW, resulting in a hand-off between the target IP core network and the other target IP core network in the wireless domain.

5. The system of claim 4, wherein the source MCF is further operable to request a target MCF coupled to the other target BPGW within the other target IP core network to set up the sixth segment of the bearer path for the bearer traffic between the other target access network and the other target BPGW.

6. The system of claim 5, wherein the source MCF communicates a session initiation protocol (SIP) "invite" message to the target MCF to request the target MCF to establish the sixth segment.

7. The system of claim 1, wherein the source IP core network supports a plurality of access networks.

8. The system of claim 1, wherein the source access network is a third-generation (3G) radio access network (RAN).

9. The system of claim 1, wherein the source MCF communicates signaling traffic with the CA using session initiation protocol (SIP).

10. The system of claim 1, wherein the source MCF communicates with the source BPGW using media gateway control protocol (MGCP) to set up or take down a segment of a bearer path.

11. The system of claim 1, wherein the bearer traffic contains voice data.

12. A system for performing a hand-off between two internet protocol (IP) core networks in a wireless domain, comprising:
a target mobility control function (MCF) within a target IP core network, the target IP core network coupled to a target access network;
the target MCF operable to receive a request from a source MCF within a source IP core network to set up a segment of a bearer path for bearer traffic associated with a mobile unit within a service area of the target access network, the bearer path being between the target access network and a target bearer path gateway (BPGW) coupled to the target MCF within the target IP core network and operable to communicate the bearer traffic between the target access network and a source BPGW, the source BPGW being within the source IP core network and operable to communicate the bearer traffic between the target BPGW and a source public switched telephone network (PSTN) gateway within the source IP core network operable to communicate the bearer traffic between the source BPGW and a PSTN coupled to the source IP core network;
the target MCF further operable to set up the segment in response to the request.

13. The system of claim 12, wherein the request is a session initiation protocol (SIP) "invite" message.

14. A method for performing a hand-off between two internet protocol (IP) core networks in a wireless domain, comprising:
taking down a first segment of a bearer path for bearer traffic associated with a mobile unit, the first segment being between a source access network providing service to the mobile unit and a source bearer path gateway (BPGW) within a source IP core network, the source BPGW operable to communicate the bearer traffic between the source access network and a public switched telephone network (PSTN) gateway within the source IP core network, the PSTN gateway operable to communicate the bearer traffic between the source BPGW and a PSTN coupled to the source IP core network, the source IP core network coupling the source access network to the PSTN; and setting up second and third segments of the bearer path for the bearer traffic in response to the mobile unit entering a service area of a target access network coupled to a target IP core network, the second segment being between the source BPGW and a target BPGW within the target IP core network, the third segment being between the target access network and the target BPGW, the target BPGW operable to communicate the bearer traffic between the target access network and the source BPGW, resulting in a hand-off between the source IP core network and the target IP core network in the wireless domain.

15. The method of claim 14, further comprising requesting a target mobile control function (MCF) coupled to the target BPGW to set up the third segment of the bearer path for the bearer traffic between the target access network and the target BPGW.

16. The method of claim 15, wherein requesting comprises communicating a session initiation protocol (SIP) "invite" message to the target MCF to request the target MCF to set up the third segment.

17. The method of claim 14, further comprising taking down the second segment and the third segment and setting up fourth and fifth segments of the bearer path for the bearer traffic in response to the mobile unit entering a service area of another target access network coupled to another target IP core network, the fourth segment being between the source BPGW and another target BPGW within the other target IP core network, the fifth segment being between the other target access network and the other target BPGW, the other target BPGW operable to communicate the bearer traffic between the other target access network and the source BPGW, resulting in a hand-off between the target IP core network and the other target IP core network in the wireless domain.

18. The method of claim 17, further comprising requesting a target MCF coupled to the other target BPGW within the other target IP core network to set up the fifth segment of the bearer path for the bearer traffic between the other target access network and the other target BPGW.

19. The method of claim 18, wherein requesting comprises communicating a session initiation protocol (SIP) "invite" message to the target MCF to request the target MCF to establish the fifth segment.

20. The method of claim 14, wherein the source IP core network supports a plurality of access networks.

21. The method of claim 14, wherein the source access network is a third-generation (3G) radio access network (RAN).

22. The method of claim 14, wherein the bearer traffic contains voice data.

23. A system for performing a hand-off between two internet protocol (IP) core networks in a wireless domain, comprising:

a source mobility control function (MCF) within a universal mobile telecommunications system (UMTS) source IP core network, the source IP core network coupled to a source third-generation (3G) radio access network (RAN) providing service to a mobile unit;

the source MCF coupled to a source bearer path gateway (BPGW), the source BPGW being within the source IP core network and operable to communicate bearer traffic associated with the mobile unit between the source access network and a public switched telephone network (PSTN) gateway within the source IP core network, the PSTN gateway operable to communicate the bearer traffic between the source BPGW and a PSTN coupled to the source IP core network;

the source MCF being functionally separate from a call agent (CA) within the source IP core network, the CA coupled to the source BPGW and operable to set up a first segment of a bearer path for the bearer traffic between the source BPGW and the PSTN gateway, signaling traffic associated with the mobile unit being communicated between the source MCF and the CA using sessions initiation protocol (SIP);

the source MCF operable to set up a second segment of the bearer path for the bearer traffic between the source RAN and the source BPGW using media gateway control protocol (MGCP);

the source MCF further operable to take down the second segment using MGCP and set up third and fourth segments of the bearer path for the bearer traffic in response to the mobile unit entering a service area of a target 3G RAN coupled to a target UMTS IP core network, the third segment being between the source BPGW and a target BPGW within the target IP core network, the fourth segment being between the target 3G RAN and the target BPGW, the target BPGW operable to communicate the bearer traffic between the target access network and the source BPGW, resulting in a hand-off between the source IP core network and the target IP core network in the wireless domain.

* * * * *